(12) United States Patent　　　(10) Patent No.:　　US 8,274,968 B2
Rosenberg et al.　　　(45) Date of Patent:　　*Sep. 25, 2012

(54) RESTRICTION OF COMMUNICATION IN VOIP ADDRESS DISCOVERY SYSTEM

(75) Inventors: Jonathan David Rosenberg, Freehold, NJ (US); Cullen F. Jennings, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 12/495,595

(22) Filed: Jun. 30, 2009

(65) Prior Publication Data

US 2010/0002686 A1　　Jan. 7, 2010

Related U.S. Application Data

(63) Continuation-in-part of application No. 11/780,928, filed on Jul. 20, 2007, and a continuation-in-part of application No. 12/370,384, filed on Feb. 12, 2009.

(51) Int. Cl.
*H04L 12/28* (2006.01)
(52) U.S. Cl. ......... 370/353; 370/352; 370/400; 370/401
(58) Field of Classification Search .......... 370/351–354, 370/356, 386, 389, 392, 395.31, 395.52, 370/400, 401, 402, 494
See application file for complete search history.

(56) References Cited

U.S. PATENT DOCUMENTS

| 5,590,370 | A | | 12/1996 | Asthana et al. | 395/800 |
|---|---|---|---|---|---|
| 5,699,514 | A | | 12/1997 | Durinovic-Johri et al. | 395/188.01 |
| 6,012,144 | A | * | 1/2000 | Pickett | 726/26 |
| 6,088,683 | A | * | 7/2000 | Jalili | 705/26.8 |
| 6,295,575 | B1 | | 9/2001 | Blumenau et al. | 711/5 |
| 6,404,870 | B1 | | 6/2002 | Kia et al. | 379/144.01 |
| 6,529,501 | B1 | | 3/2003 | Zhao et al. | 370/353 |
| 6,674,850 | B2 | | 1/2004 | Vu et al. | 379/220.01 |
| 6,700,964 | B2 | * | 3/2004 | Schmid et al. | 379/189 |
| 6,950,652 | B2 | | 9/2005 | Janssen et al. | 455/419 |
| 6,961,334 | B1 | * | 11/2005 | Kaczmarczyk | 370/354 |
| 7,016,343 | B1 | | 3/2006 | Mermel et al. | 370/356 |
| 7,143,052 | B2 | | 11/2006 | LaSalle et al. | 705/7 |
| 7,188,138 | B1 | | 3/2007 | Schneider | 709/203 |
| 7,190,772 | B2 | * | 3/2007 | Moisey et al. | 379/114.27 |
| 7,218,722 | B1 | * | 5/2007 | Turner et al. | 379/221.02 |
| 7,266,114 | B2 | | 9/2007 | Furukawa et al. | 370/352 |

(Continued)

FOREIGN PATENT DOCUMENTS

EP　　1 009 153 A1　　6/2000

(Continued)

OTHER PUBLICATIONS

Seedorf, Jan; SIP Security: Status Quo and Future Issues; Dec. 27, 2006; 23rd Chaos Communication Congress; pp. 1-5.*

(Continued)

*Primary Examiner* — Robert Scheibel
*Assistant Examiner* — Mark A Mais
(74) *Attorney, Agent, or Firm* — Brinks Hofer Gilson & Lione

(57) ABSTRACT

In one embodiment, a system is provided to restrict VoIP communication. The system may validate a Voice over Internet Protocol (VoIP) call initiation message based on demonstrated knowledge of a Public Switched Telephone Network (PSTN) call.

20 Claims, 6 Drawing Sheets

U.S. PATENT DOCUMENTS

| | | | |
|---|---|---|---|
| 7,289,493 B1 | 10/2007 | Vera | 370/356 |
| 7,352,856 B2 | 4/2008 | Matsuhashi et al. | 379/387.02 |
| 7,383,572 B2* | 6/2008 | Rolfe | 726/5 |
| 7,394,803 B1* | 7/2008 | Petit-Huguenin et al. | 370/352 |
| 7,457,283 B2* | 11/2008 | Dalton et al. | 370/352 |
| 7,602,734 B2 | 10/2009 | Tang et al. | 370/254 |
| 7,729,700 B2* | 6/2010 | Alemany et al. | 455/436 |
| 7,822,188 B1 | 10/2010 | Kirchhoff et al. | 379/211.02 |
| 7,852,831 B2* | 12/2010 | Akbar | 370/352 |
| 7,855,982 B2* | 12/2010 | Ramankutty et al. | 370/259 |
| 7,983,243 B2* | 7/2011 | Casey et al. | 370/352 |
| 8,040,875 B2* | 10/2011 | Barclay et al. | 370/352 |
| 2002/0004900 A1 | 1/2002 | Patel | 713/155 |
| 2003/0053605 A1* | 3/2003 | Cashiola | 379/88.17 |
| 2003/0055898 A1 | 3/2003 | Yeager et al. | 709/205 |
| 2004/0067761 A1 | 4/2004 | Pyhalammi et al. | 455/466 |
| 2005/0232428 A1* | 10/2005 | Little et al. | 380/277 |
| 2006/0182029 A1* | 8/2006 | Kealy et al. | 370/230 |
| 2006/0216131 A1 | 9/2006 | Jhuang | 411/181 |
| 2006/0294576 A1* | 12/2006 | Cross et al. | 726/1 |
| 2007/0183440 A1 | 8/2007 | Bennet et al. | 370/419 |
| 2007/0201660 A1 | 8/2007 | Lan et al. | 379/201.01 |
| 2007/0248098 A1 | 10/2007 | Chen | 370/395.2 |
| 2008/0052270 A1 | 2/2008 | Karlsson | 707/3 |
| 2008/0292077 A1 | 11/2008 | Vinokurov et al. | 379/142.04 |
| 2009/0022149 A1 | 1/2009 | Rosenberg et al. | 370/389 |
| 2009/0022150 A1 | 1/2009 | Rosenberg et al. | 370/389 |
| 2009/0022155 A1 | 1/2009 | Rosenberg et al. | 370/392 |
| 2009/0025075 A1 | 1/2009 | Chow et al. | 726/10 |
| 2009/0100262 A1 | 4/2009 | Yoo | 713/155 |
| 2009/0323677 A1 | 12/2009 | Mehmood et al. | 370/352 |
| 2010/0002687 A1 | 1/2010 | Rosenberg et al. | 370/352 |
| 2010/0046507 A1 | 2/2010 | Rosenberg et al. | 370/352 |
| 2010/0082828 A1 | 4/2010 | Jennings et al. | 709/229 |
| 2010/0157853 A1 | 6/2010 | Li et al. | 370/271 |

FOREIGN PATENT DOCUMENTS

| | | | |
|---|---|---|---|
| EP | 1 385 323 A1 | 1/2004 | |
| EP | 1 555 786 A1 | 7/2005 | |
| EP | 1 855 104 A1 | 2/2008 | |
| JP | 2004-040541 | 2/2004 | |
| JP | 2004-304281 | 10/2004 | |
| WO | WO 2009/014974 A1 | 1/2009 | |

OTHER PUBLICATIONS

Seedorf, Jan; Using Cryptographically Generated SIP-URIs to protect the integrity of content in P2P-SIP; Third Annual VoIP Security Workshop; Jun. 2, 2006.*

Niccolini, Saverio; SPIT Prevention: state of the art and research challenges; Third Annual VoIP Security Workshop; Jun. 2, 2006.*

Materna, Bogden; Threat Mitigation for VoIP; Third Annual VoIP Security Workshop; Jun. 2, 2006.*

Hansen et al.; Developing a Legally Compliant Reachability management system as a Countermeasure against SPIT; Third Annual VoIP Security Workshop; Jun. 2, 2006.*

Jennings et al.; Verification Involving PSTN Reachability: Requirements and Architecture Overview; Apr. 1, 2011; Internet Engineering Task Force; Version 00; pp. 1-41.*

Marias et al.; SIP Vulnerabilities and Anti-SPIT Mechanisms Assessment; Aug. 16, 2007; IEEE Computer Communications and Networks, 2007. Proceedings of 16th International Conference on Computer Communications and Networks (ICCCN), 2007; pp. 597-604.*

Wu, T., The SRP Authentication and Key Exchange System, dated Sep. 2000, pp. 1-11, The Internet Society.

Rosenberg, J., Jennings, C., The Session Initiation Protocol (SIP) and Spam, dated Jan. 2008, pp. 1-37, The IETF Trust.

Falstrom, P., "E 164 number and DNS", Request for Comments No. 2916, Network Working Group, Sep. 2000, p. 1-9, Cisco Systems, Inc.

International Search Report dated Dec. 12, 2008, pp. 1-5, International Application No. PCT/US2008/070259, European Patent Office, The Netherlands.

Written Opinion dated Dec. 12, 2008, pp. 1-6, Application No. PCT/US2008/070259, European Patent Office, Germany.

Call detail record, dated May 5, 2009, pp. 1-2, Wikipedia, http://en.wikipedia.org/wiki/Call_detail_record.

Computer telephony integration, dated May 12, 2009, pp. 1-4, Wikipedia, http://en.wikipedia.org/wiki/Computer_telephony_integration.

Provisioning Protocol-Specific Interfaces, dated 2007, pp. 1-2, available at www.cisco.com, Cisco.

U.S. Appl. No. 12/370,384, filed Feb. 12, 2009, Rosenberg et al.

U.S. Appl. No. 12/367,930, filed Feb. 2, 2009, Rosenberg.

U.S. Appl. No. 12/495,615, filed Jun. 30, 2009, Mehmood et al.

U.S. Appl. No. 12/495,639, filed Jun. 30, 2009, Rosenberg et al.

Neuman, C., Hartman, S., Raeburn, K., RFC 4120, dated Jul. 2005, pp. 1-139, The Internet Society.

Understanding DNSBL Filtering, Spamhaus, dated Oct. 25, 2007, pp. 1-3, www.spamhaus.org.

Bryan, D., Matthews, P., Shim, E., Willis, D., Concepts and Terminology for Peer to Peer SIP, dated Jun. 2007, pp. 1-26, IETF.

Freedman, M., Morris, R., Tarzan: A Peer-to-Peer Anonymizing Network Layer, dated 2002, pp. 1-14, ACM, Washington, D.C.

Tor: Overview, dated Mar. 2, 2009, pp. 1-5, The Tor Project, Inc., available at www.torproject.org.

Wang, X., Chen, S., Jajodia, S., Tracking Anonymous Peer-to-Peer VoIP Calls on the Internet, dated 2005, pp. 1-11, ACM, Alexandria, Virginia.

Ramasubramanian, V., Sirer, E., Perils of Transitive Trust in the Domain Name System, dated May 13, 2005, pp. 1-6, Cornell University, available at http://ecommons.library.cornell.edu.

Walsh, K., Sirer, E., Experience with an Object Reputation System for Peer-to-Peer Filesharing, dated 2006, pp. 1-14, USENIX Association.

Office Action, dated May 20, 2010, pp. 1-14, U.S. Appl. No. 11/780,975, U.S. Patent and Trademark Office, Virginia.

International Search Report dated Apr. 5, 2010, pp. 1-3, International Application No. PCT/US2010/022004, European Patent Office, The Netherlands.

Written Opinion dated Apr. 5, 2010, pp. 1-7, Application No. PCT/US2010/022004, European Patent Office, Germany.

Notice of Allowance, dated Sep. 14, 2010, pp. 1-6, U.S. Appl. No. 11/780,975, U.S. Patent and Trademark Office, Virginia.

Office Action dated Oct. 6, 2010, pp. 1-11, U.S. Appl. No. 12/370,384, U.S. Patent and Trademark Office, Virginia.

Office Action, dated Jan. 7, 2011, pp. 1-43, U.S. Appl. No. 12/367,930, U.S. Patent and Trademark Office, Virginia.

Office Action, dated Jan. 12, 2011, pp. 1-44, U.S. Appl. No. 12/495,615, U.S. Patent and Trademark Office, Virginia.

Office Action, dated Jan. 6, 2011, pp. 1-49, U.S. Appl. No. 11/780,928, U.S. Patent and Trademark Office, Virginia.

Office Action, dated Jan. 6, 2011, pp. 1-43, U.S. Appl. No. 11/780,941, U.S. Patent and Trademark Office, Virgina.

Office Action, dated Jan. 13, 2011, pp. 1-53, U.S. Appl. No. 12/495,639, U.S. Patent and Trademark Office, Virginia.

Office Action, dated Jan. 20, 2011, pp. 1-56, U.S. Appl. No. 12/608,484, U.S. Patent and Trademark Office, Virginia.

Office Action, dated Feb. 4, 2011, pp. 1-71, U.S. Appl. No. 12/608,545, U.S. Patent and Trademark Office, Virginia.

Office Action, dated Mar. 8, 2011, pp. 1-34, U.S. Appl. No. 12/370,384, U.S. Patent and Trademark Office, Virginia.

International Search Report, dated Nov. 4, 2010, pp. 1-3, International Application No. PCT/US2010/037459, European Patent Office, The Netherlands.

Written Opinion, dated Nov. 4, 2010, pp. 1-8, International Application No. PCT/US2010/037459, European Patent Office, The Netherlands.

Rosenberg, J. et al., RFC 5039—The Session Initiation Protocol (SIP) and Spam, dated Jan. 2008, pp. 1-27, www.rfc-editor.org/rfc/rfc5039.txt.

Rosenberg, J. et al., The Session Initiation Protocol (SIP) and Spam—draft-rosenberg-sipping-spam-00, dated Jul. 11, 2004, pp. 1-21, IETF, http://tools.ietf.org/html/draft-rosenberg-sipping-spam-00.

Cao, Feng et al., Providing Response Identity and Authentication in IP Telphony, dated 2006, pp. 1-8, IEEE Computer Society.

International Preliminary Report on Patentability, dated Jan. 26, 2010, pp. 1-7, International Application No. PCT/US2008/070259, International Bureau of WIPO, Switzerland.
Lack of Unity Action and Partial International Search, dated Mar. 3, 2011, pp. 1-6. International Application No. PCT/US2010/051820, European Patent Office, The Netherlands.
d'Heureuse, Nico et al., Protecting SIP-based Networks and Services from Unwanted Communications, dated 2008, pp. 1-5, IEEE.
Chiang, Hsia-Ling et al., A Study of Global Numbering Plan With Active Anti-Spit Capability on Voip, dated 2008, pp. 17-22, IEEE.
Office Action, dated Nov. 1, 2011, pp. 1-41, U.S. Appl. No. 11/780,928, U.S. Patent and Trademark Office, Virginia.
Office Action, dated Nov. 3, 2011, pp. 1-41, U.S. Appl. No. 11/780,941, U.S. Patent and Trademark Office, Virginia.
European Office Action, dated Nov. 14, 2011, pp. 1-4, European Patent Application No. 08781931.4, European Patent Office, Germany.
Notice of Allowance, dated Jul. 28, 2011, pp. 1-9, U.S. Appl. No. 11/780,975, U.S. Patent and Trademark Office, Virginia.
Notice of Allowance, dated Oct. 5, 2011, pp. 1-8, U.S. Appl. No. 12/370,384, U.S. Patent and Trademark Office, Virginia.
International Search Report, dated Mar. 18, 2011, International Application No. PCT/US2010/051822, European Patent Office, The Netherlands.
Office Action, dated Jun. 22, 2011, pp. 1-40, U.S. Appl. No. 11/780,928, U.S. Patent and Trademark Office, Virginia.
Office Action, dated Jun. 22, 2011, pp. 1-31, U.S. Appl. No. 11/780,941, U.S. Patent and Trademark Office, Virginia.
Office Action, dated Jun. 24, 2011, pp. 1-34, U.S. Appl. No. 12/608,545, U.S. Patent and Trademark Office, Virginia.
Office Action, dated Jun. 27, 2011, pp. 1-38, U.S. Appl. No. 12/367,930, U.S. Patent and Trademark Office, Virginia.
Office Action, dated Jun. 27, 2011, pp. 1-36, U.S. Appl. No. 12/495,615, U.S. Patent and Trademark Office, Virginia.
Office Action, dated Jun. 27, 2011, pp. 1-40, U.S. Appl. No. 12/495,639, U.S. Patent and Trademark Office, Virginia.
Office Action, dated Jun. 27, 2011, pp. 1-41, U.S. Appl. No. 12/608,484, U.S. Patent and Trademark Office, Virginia.
International Search Report, dated Jun. 29, 2011, International Application No. PCT/US2010/051820, European Patent Office, The Netherlands.
Notice of Allowance, dated Aug. 18, 2011, pp. 1-10, U.S. Appl. No. 12/370,384, U.S. Patent and Trademark Office, Virginia.
International Preliminary Report on Patentability, dated Aug. 9, 2011, pp. 1-7, International Application No. PCT/US2010/022004, International Bureau of WIPO, Switzerland.
Notice of Allowance, dated Apr. 7, 2011, pp. 1-17, U.S. Appl. No. 11/780,975, U.S. Patent and Trademark Office, Virginia.
Notice of Allowance, dated Feb. 16, 2011, pp. 1-11, U.S. Appl. No. 11/780,928, U.S. Patent and Trademark Office, Virginia.
Notice of Allowance, dated Feb. 22, 2012, pp. 1-11, U.S. Appl. No. 11/780,941, U.S. Patent and Trademark Office, Virginia.
Office Action, dated Jan. 5, 2012, pp. 1-41, U.S. Appl. No. 12/367,930, U.S. Patent and Trademark Office, Virginia.
Office Action, dated Jan. 23, 2012, pp. 1-41, U.S. Appl. No. 12/608,484, U.S. Patent and Trademark Office, Virginia.
Office Action, dated Jan. 23, 2012, pp. 1-41, U.S. Appl. No. 12/608,545, U.S. Patent and Trademark Office, Virginia.
Office Action, dated Jan. 23, 2012, pp. 1-39, U.S. Appl. No. 12/495,639, U.S. Patent and Trademark Office, Virginia.
Office Action, dated Jan. 26, 2012. pp. 1-51, U.S. Appl. No. 12/495,615, U.S. Patent and Trademark Office, Virginia.
International Preliminary Report on Patentability and Written Opinion, dated Jan. 12, 2012, pp. 1-8, International Application No. PCT/US2010/037459, International Bureau of WIPO, Switzerland.

* cited by examiner

| Ticket Identifier | 202 |
|---|---|

| Version | 204 |
|---|---|

| Encryption Algorithm Identifier | 206 |
|---|---|

| Salt | 208 |
|---|---|

| Initialization Vector | 210 |
|---|---|

| Encrypted Message | 224 |
|---|---|
| Period of Validity | 212 |
| Set of Phone Number Ranges | 214 |
| Service Identifiers | 216 |
| Granter 218 · Epoch 221 | |
| Grantee | 220 |

| Message Authentication Code | 222 |
|---|---|

RESTRICTION OF COMMUNICATION IN VOIP ADDRESS DISCOVERY SYSTEM

This application claims priority under 35 U.S.C. §120 to U.S. patent application Ser. No. 11/780,928, "USING PSTN REACHABILITY TO VERIFY VOIP CALL ROUTING INFORMATION" filed Jul. 20, 2007, the entire contents of which are hereby incorporated herein by reference, and to U.S. patent application Ser. No. 12/370,384, "PREVENTION OF VOICE OVER IP SPAM" filed Feb. 12, 2009, the entire contents of which are hereby incorporated herein by reference.

TECHNICAL FIELD

The present disclosure relates generally to Voice over Internet Protocol (VoIP).

BACKGROUND

Voice over Internet Protocol (VoIP) is widely used within enterprise networks and within service provider networks. However, use of VoIP between businesses on separate enterprise networks is less common. One reason for this is that if a business were to accept incoming VoIP requests from any enterprise, the business may be subject to VoIP spam. VoIP spam includes unsolicited or undesired bulk electronic messages sent using one or more VoIP protocols.

Additionally, even if VoIP spam could be detected, the servers processing incoming VoIP requests could be overloaded by the task of detecting and rejecting the VoIP spam. The overloading of the servers may result in a degradation of performance of all VoIP communications in the enterprise.

BRIEF DESCRIPTION OF THE DRAWINGS

The components and the figures are not necessarily to scale, emphasis instead being placed upon illustrating the principles of the invention. Moreover, in the figures, like-referenced numerals designate corresponding parts throughout the different views.

FIG. 2 illustrates a format of the ticket in one embodiment of the system to prevent VoIP spam;

DESCRIPTION OF EXAMPLE EMBODIMENTS

Overview

Figure 1:
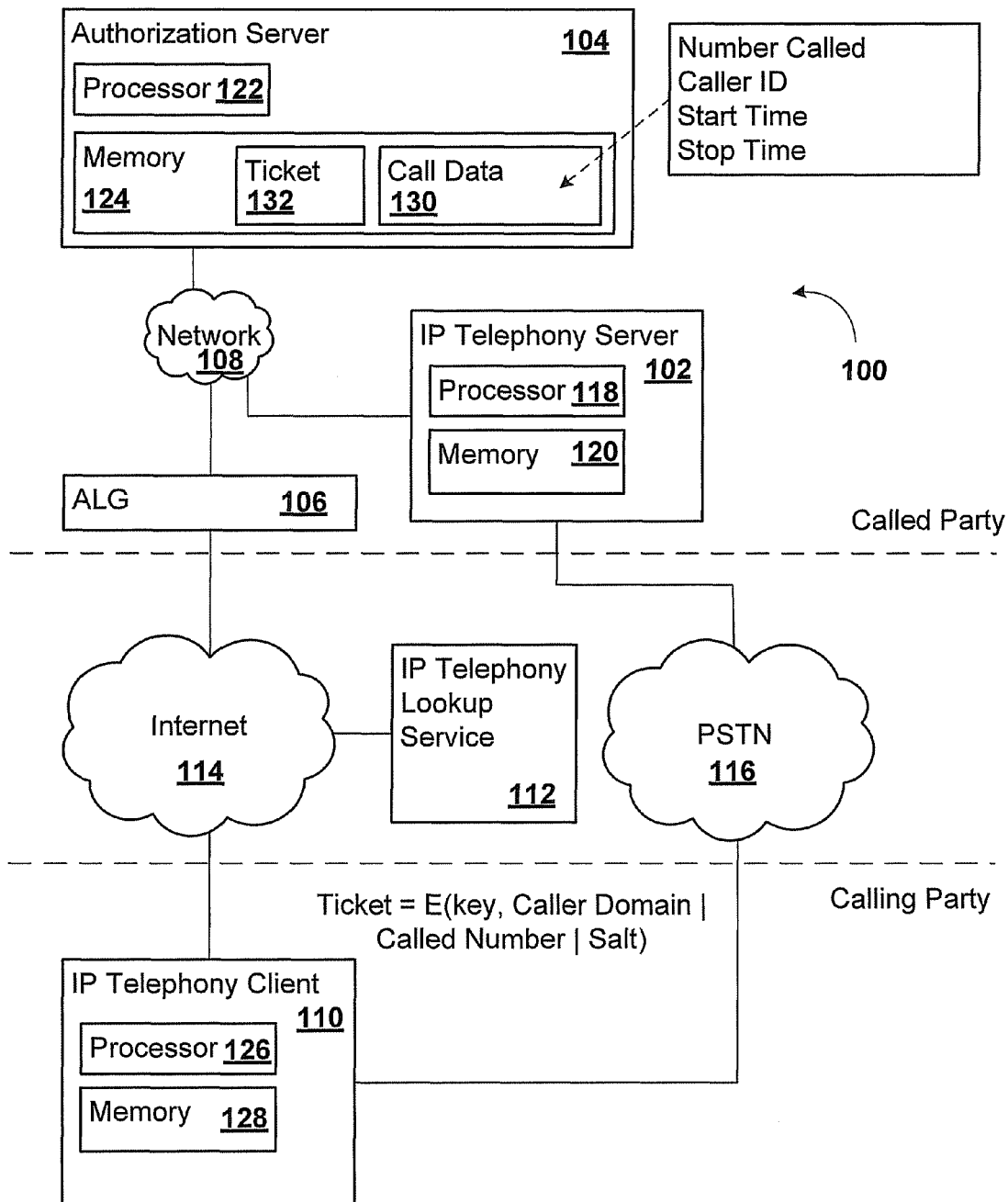
FIG. 1 illustrates one embodiment of a system to prevent VoIP spam.

By way of introduction, the example embodiments described below include a system, logic encoded in a computer readable media, and a method to restrict VoIP communication.

According to a first aspect, a system to restrict VoIP communication may include a processor and a memory, with computer code in the memory. The system may validate a Voice over Internet Protocol (VoIP) call initiation message based on demonstrated knowledge of a Public Switched Telephone Network (PSTN) call.

In a second aspect, logic is encoded in one or more tangible media for execution. The logic, when executed, may store knowledge of a Public Switched Telephone Network (PSTN) call initiated over a circuit switched network to a telephone phone number. The logic may also determine a destination address for the telephone phone number. Additionally, the logic may transmit at least one message to the destination address to demonstrate the knowledge of the PSTN call for authorization to create a Voice over Internet Protocol (VoIP) connection to a destination call agent.

In a third aspect, a method is provided. Proof of knowledge of a Public Switched Telephone Network (PSTN) call may be received. A Voice over Internet Protocol (VoIP) call initiation message may be validated based on whether the proof of knowledge of the PSTN call is received.

The present invention is defined by the following claims, and nothing in this section should be taken as a limitation on those claims. Further aspects and advantages of the invention are discussed below in conjunction with the example embodiments.

Example Embodiments

In one embodiment, a system to prevent VoIP spam may include a VoIP server such as CISCO® Unified Communications Manager from Cisco Technologies, Inc. of San Jose, Calif. The VoIP server may be in communication with a Public Switched Telephone Network (PSTN). The VoIP server may be reachable at a phone number over the PSTN. During operation, the VoIP server may follow a rule whereby the VoIP server may accept a VoIP call, which is directed to the phone number, from a VoIP client as long as the VoIP client, or another VoIP client from the same organization, had previously called the phone number over the PSTN.

By following this rule, the VoIP server may prevent VoIP spam. A spammer, in order to initiate a VoIP call to the VoIP server, would have to call the phone number over the PSTN first. Having to call the phone number over the PSTN forces the spammer to incur any costs associated with making the PSTN call and subjects the spammer to PSTN do-not-call lists and other regulations. Spam is possible when sending spam is inexpensive. The rule imparts an automatic cost to sending spam.

Alternatively or in addition, the VoIP server may follow a rule whereby the VoIP server limits acceptance of incoming VoIP calls to VoIP calls that originate from a domain included in a set of trusted domains. Alternatively or in addition, the VoIP server may follow a rule whereby the VoIP server blocks incoming VoIP calls if the calls originated from a domain included in a list of black-listed domains.

Furthermore, to avoid overloading the VoIP server, an authorization server separate from the VoIP server may issue a digitally signed ticket valid for a VoIP client satisfying one or more policy rules. For example, the policy rules may include the rule that the VoIP client should belong to a domain included among the set of trusted domains. Additionally, an Application-Level Gateway (ALG) separate from the VoIP server may validate incoming VoIP call requests. Incoming VoIP call requests may pass through the ALG before reaching the VoIP server. The ALG may block incoming VoIP call requests that do not include a valid ticket.

For example, if the VoIP client transmits a request to create a VoIP call to the VoIP server, the ALG on the path to the VoIP server may verify that the request (1) includes a valid ticket and (2) originated from a domain identified in the digitally signed ticket. The ALG may determine the originating domain from which the request originated by checking the domain in a public key certificate presented by the VoIP client. The ALG does not need to determine whether the domain of the VoIP client is included in the set of trusted domains. Instead, the VoIP client matches the domain in the ticket with the domain in the public key certificate. The authorization server already verified that issuing a ticket to the VoIP client satisfied the policy rules. In doing so, the authorization server already checked that the domain of the VoIP client is included in the set of trusted domains. Accordingly, the processing at the ALG to verify the request is minimal, and the VoIP server may accept the incoming VoIP call request if the ALG forwarded the request. If the authorization server becomes overloaded, then the ALG and the VoIP server may continue to function unimpaired.

Alternatively or in addition, the VoIP client may follow a policy rule of restricting outgoing calls to domains included in the set of trusted domains. For example, before the VoIP client transmits an outgoing VoIP call request, the VoIP client may check that the domain included in a public key certificate presented by the VoIP server is included in the set of trusted domains.

The VoIP client may act as a VoIP server and, conversely, the VoIP server may act as a VoIP client. Using the domain checks, the VoIP client, the VoIP server, and any other suitably configured call agent may form a virtual private VoIP network even if VoIP address information may be obtained for call agents outside of the virtual private VoIP network. Receiving VoIP calls into and transmitting VoIP calls out of the virtual private VoIP network may be thus restricted or even eliminated.

FIG. 1 illustrates one embodiment of a system 100 to prevent VoIP spam. The system may include an IP telephony server 102, an authorization server 104, an application layer gateway 106, and a network 108.

The system 100 may include additional, different, or fewer components. For example, the system 100 may not include an application layer gateway 106. In another example, the IP telephony server 102 and the authorization server 104 may be included in the same device. In still another example, the system 100 may include multiple authorization servers 104. In yet another example, the system 100 may include multiple IP telephony servers 102. Alternatively or additionally, the system 100 may include one or more IP telephony clients 110 and/or an IP telephony lookup service 112. In still another example, the authorization server 104 and the IP telephony lookup service 112 may be the same device.

The IP telephony server 102 may be any device or combination of devices capable of accepting IP telephony connection requests. An IP telephony connection may be any voice over data connection or instant messaging connection. A voice over data connection may be any connection that transmits an audio, a visual, or an audiovisual signal over a network designed to exchange data. Examples of the voice over data connection include a VoIP connection and a voice connection established with Jabber. Jabber includes instant messaging technology and provides a set of standards for real-time communications. The IP telephony connection may be a connection based on a VoIP protocol, such as Session Initiation Protocol (SIP), Inter-Asterisk exchange, H.323, Skinny Client Control Protocol (SCCP) or GoogleTalk. Examples of the IP telephony server 102 include the CISCO® Unified Communications Manager or any other call agent.

The authorization server 104 may be any device or combination of devices that determines whether a request to create the IP telephony connection is authorized based on one or more determined rules. Alternatively or in addition, the authorization server 104 may be any device or combination of devices that determines whether a VoIP call agent is authorized to issue a request to create the IP telephony connection to the IP telephony server 102. In one example, the authorization server 104 may be in communication with the IP telephony server 102 over the network 108. The network 108 may be a Local Area Network (LAN), a Wireless Local Area Network (WLAN), a Personal Area Network (PAN), a Wide Area Network (WAN), or any other now known or later developed communications network. Additionally or alternatively, the authorization server 104 may be in communication with the application layer gateway (ALG) 106 over the network 108.

The ALG 106 may be any device or combination of devices that provides application level security to augment a firewall or Network Address Translator (NAT). For example, the ALG 106 may prevent an unauthorized request to create the IP telephony connection from entering the network 108. The ALG 106 may also be in communication with the Internet 114 or with some other untrusted network.

The IP telephony Client 110 may be in communication with the Internet 114 or with some other untrusted network. The IP telephony Client 110 may be any device or combination of devices that may initiate creation of the IP telephony connection. For example, the IP telephony Client 110 may be a VoIP server, a call agent, the CISCO® Unified Communications Manager, a hard phone, a soft phone, a mobile phone, a conference phone, a teleconferencing unit, a personal computer, a laptop, an application specific integrated circuit, or a combination thereof. The IP telephony client 110 may also initiate a call over the PSTN 116.

The IP telephony lookup service 112 is any device or combination of devices that may determine a destination address from a phone number, where the destination address is any identifier that may be used to initiate the IP telephony connection to a party associated with the phone number. For example, the destination address may include a network address, such as an IP address. The destination address may include protocol specific information such as "sip:", "http:", and "https:".

One example of the IP telephony lookup service 112 may include a a peer-to-peer network of nodes that maintain a registry of VoIP call routing information. A second example of the IP telephony lookup service 112 may include a system that supports the Telephone Number Mapping (ENUM) suite of protocols as described in Request For Comments (RFC) 3761. A third example of the IP telephony lookup service 112 may include a database maintained on one or more server computers.

The IP telephony server 102 may include a processor 118 and a memory 120. The authorization server 104 may also include a processor 122 and a memory 124. The IP telephony client 110 may also include a processor 126 and a memory 128. The memory 120, 124, and 128 may be any now known, or later discovered, data storage device. The memory 120, 124, and 128 may be a non-volatile and/or volatile memory, such as a random access memory (RAM), a read-only memory (ROM), an erasable programmable read-only memory (EPROM), or flash memory. The memory 120, 124, and 128 may include an optical, magnetic (hard-drive) or any other form of data storage device.

The processor 118, 122, 126 may be in communication with the memory 120, 124, and 128. The processor 118, 122, 126 may also be in communication with additional components, such as the network 108, the Internet 114, or the PSTN 116. The processor 118, 122, 126 may be a general processor, central processing unit, server, application specific integrated circuit (ASIC), digital signal processor, field programmable gate array (FPGA), digital circuit, analog circuit, or combinations thereof.

During operation, the IP telephony client 110 may initiate a call over the PSTN 116 to a phone number that is assigned to the IP telephony server 102. The IP telephony server 102 may be in communication with the PSTN 116 and, thus, be able to receive incoming PSTN calls. For example, the IP telephony server 102 may include an IP Private Branch Exchange (IP-PBX). If the call completes, the IP telephony server 102 may store call data 130 associated with the call in the memory 120 of the IP telephony server 102. Alternatively or additionally, the IP telephony server 102 may store the call data 130 in a database. In one example, the IP telephony server 102 may transmit the call data to the authorization server 104 and the authorization server 104 stores the call data 130.

The call data 130 may include any information associated with the call or received during the call. For example, the call data 130 may include the phone number, a start time of the call, an end time of the call, caller ID information, any other call attribute, or any combination thereof. The call data 130 may also include information associated with multiple calls. The call data 130 may also include tones or signals, such as Dual-Tone Multi-Frequency (DTMF), transmitted during the call. The call data may also include information related to the speech exchanged during the call, such as information derived from a speech compression algorithm, or information on talkspurts and silence periods during the call.

The authorization server 104 may enforce a rule where the authorization server 104 authorizes the IP telephony connection to the IP telephony server 102 from the IP telephony client 110 for a call to a number as long as the IP telephony client 110, or another IP telephony client within the same organization, had previously called the phone number over the PSTN 116. In order to enforce the rule, the authorization server 104 may communicate with the IP telephony client 110 to determine whether the IP telephony client 110 can provide a demonstrated knowledge of the call.

The demonstrated knowledge of the call may be information that indicates a possessor of the information knows of the call. For example, the demonstrated knowledge may include all or a portion of the call data 130, such as the end time of the call. In one example, the demonstrated knowledge may include a value determined based on all or a portion of the call data 130, such as a hash of a concatenation of the start time of the call and the end time of the call. In other examples, the demonstrated knowledge may include the union of the start times and end times of a set of calls made from the IP telephony client 110 to the IP telephony server 102 over the PSTN 116. In still other examples, the demonstrated knowledge may be considered a shared secret between the authorization server 104 and the IP telephony client 110. In such examples, the IP telephony client 110 may demonstrate knowledge of the call using a shared-secret based protocol. A shared-secret based protocol may be any protocol enabling secure communication between two devices based a demonstration of knowledge of a shared secret. A shared-secret protocol may be shared prior to the communication or by using a key-agreement protocol. Thus, when a shared-secret based protocol is used to demonstrate knowledge of the call, the call data 130 and/or the demonstrated knowledge may not be sent between the two devices. An example of a shared-secret based protocol includes a Secure Remote Password (SRP) protocol, such as the Transport Layer Security (TLS) SRP protocol.

The authorization server 104 may communicate with the IP telephony client 110 using one or more mechanisms. In one example, the IP telephony client 110 may determine the destination address of the IP telephony server 102 or authorization server 104 using the IP telephony lookup service 112. The IP telephony client 110, after completing the call over the PSTN 116, may transmit to the authorization server 104 a request for authorization to create a new IP telephony connection at a later time. As part of the request, the IP telephony client 110 may demonstrate to the authorization server 104 that the IP telephony client 110 has knowledge of the call data 130 using any suitable mechanism. For example, one way is to treat the call data 130 as a shared secret, and use a shared secret login protocol, such as the Secure Remote Password (SRP) protocol. Alternatively or additionally, the IP telephony client 110 may transmit the call data 130 to the authorization server 104 using any suitable protocol, including Hypertext Transport Protocol (HTTP), SIP, or any other protocol which can transmit information from a client to a server. The authorization server 104 may verify that the demonstrated knowledge of the call matches the call data 130 previously stored by the authorization server 104. If the authorization server 104 finds a match, then the authorization server 104 may authorize receipt of the request to create the IP telephony connection.

In a second example, the authorization server 104 may determine the phone number of a calling party from caller ID information included in the call data 130. The authorization server 104 may query the IP telephony lookup service 112 to find the destination address associated with the phone number of the calling party. The authorization server 104 may transmit a request to demonstrate knowledge of the call data 130 to the IP telephony client 110. The IP telephony client 110 may receive the request at the destination address. For example, the IP telephony client 110 may receive a Secure Hypertext Transfer Protocol (HTTPS) request or a request over Transport Layer Security (TLS) from the authorization server 104. The IP telephony client 110 may demonstrate to the authorization server 104 that the IP telephony client 110 has knowledge of the call data 130 using any suitable mechanism.

In one example, the authorization server 104 or the IP telephony client 110 may transmit the request to demonstrate knowledge of the call data 130 or the request for authorization to create the new IP telephony connection at a later time after the passage of a random amount of time since the call over the PSTN 116 was made. For example, the random amount of time may be anytime within a day of the call. The random passage of time may effectively prevent the IP telephony client 110 or the authorization server 104 from guessing start times or end times based on how quickly after the call the request to demonstrate knowledge or the request for authorization occurs.

After verifying that the demonstrated knowledge matches the call data 120, the authorization server 104 may generate a ticket 132. The ticket 132 may include information that indicates what permissions are granted to the holder of the ticket and/or information about who is permitted to hold the ticket. In one example, the ticket 132 may include a reference to such information, which is stored in the memory 124 of the authorization server 104 or in a database. Alternatively, the ticket 132 may contain the information instead of a reference to such information. The information in the ticket, or stored by authorization server 104 and associated with the ticket 132, may include the phone number of the called party that may be called with the ticket 132. The information may also include the Domain Name System (DNS) domain which may utilize the ticket. The authorization server 104 may transmit the ticket 132 to the IP telephony client 110 in response to receipt of proof of knowledge of the call data 130 from the IP telephony client 110.

Alternatively or in addition, the authorization server 104 may generate a ticket 132 after verifying generation of the ticket 132 complies with other policy rules. For example, the authorization server 104 may verify that the domain of the IP telephony client 110 is a trusted domain before generating the ticket 132. In another example, the authorization server 104 may verify that the domain of the IP telephony client 110 is not an untrusted domain. The authorization server 104 may store a whitelist and/or a blacklist in the memory 124 of the authorization server 104. The whitelist may include a list of trusted domains. The blacklist may include a list of untrusted domains for which tickets should not be granted. The domains may be network domains, organization names, or any other identifier of a potential source of VoIP calls. Examples of the domains include "a.com," a.org," and "ACME Corporation." In one example, the policy rules may include the whitelist and/or blacklist check and the requirement for demonstrated knowledge of the PSTN call. In another example, the policy rules may include the whitelist or blacklist check, but not the requirement for demonstrated knowledge of the PSTN call.

After receiving the ticket 132, the IP telephony client 110 may store the ticket 132, the destination address of the IP telephony server 102, and the phone number called over the PSTN 116. The IP telephony client 110 may now transmit the ticket 132 to the IP telephony server 102 when initiating a request to create the IP telephony connection to the IP telephony server 102, possibly through ALG 106. The request to create the IP telephony connection may include a VoIP connection request. The VoIP connection request may include a request to create an initial connection between two endpoints, such as a TCP session, and a call initiation message as part of a call control protocol, such as a Session Initiation Protocol (SIP) invite request. Alternatively, the VoIP connection request may include the call initiation message without the request to create the initial connection. Thus, in one example, the IP telephony client 110 may include the ticket 132 in the call initiation message. For example, the IP telephony client 110 may include the ticket 132 in a header field, such as an X-Cisco-Passkey field, of a Session Initiation Protocol (SIP) invite request.

Alternatively or in addition, the IP telephony client 110 may provide the ticket 132 as part of the request to create the initial connection. For example, the IP telephony client 110 may transmit the ticket 132 when establishing the initial connection between the IP telephony client 110 and the IP telephony server 102, such when establishing a TCP/TLS connection between the IP telephony client 110 and the IP telephony server 102. New VoIP connection requests may subsequently be accepted over the TCP/TLS connection.

If the IP telephony client 110 is to call the phone number, the IP telephony client 110 may initiate a call using the IP telephony connection and transmit the ticket to the IP telephony server 102. If the IP telephony client 110 has not yet received the ticket 132, the IP telephony client 110 may first initiate the call over the PSTN 116.

The ticket 132 may be generated using any number of mechanisms. In one example, the authorization server 104 may generate the ticket 132 using an encryption function. For example, the ticket 132 may be generated as the following encryption function: ticket=E(key, calling domain|called phone number|salt). In this example, the authorization server 104 encrypts the concatenation of the calling domain, the called phone number, and the salt using the key. The key may be a piece of information that determines the functional output of a cryptographic algorithm, where the piece of information is known to the authorization server 104, such as a symmetric key or an asymmetric key. The calling domain may be the Domain Name System (DNS) name of the organization of the IP telephony client 110. For example, the calling domain may be "a.com." The called phone number may be the phone number called over the PSTN 116. The salt may be a random number.

When the IP telephony server 102 receives the ticket 132 in the IP telephony connection request from the IP telephony client 110, the IP telephony server 102 may transmit the ticket 132 to the authorization server 104 to authorize the IP telephony connection. Using the key, the authorization server 104 may decrypt the ticket 132 and extract an extracted called phone number and an extracted calling domain. In one example, the authorization server 104 may verify that the extracted called phone number and the extracted calling domain respectively match the phone number and destination address of the called party from the IP telephony signaling. Alternatively or additionally, the authorization server 104 may verify that the extracted calling domain matches the destination address of the IP telephony client 110 requesting the IP telephony connection. For example, the authorization server 104 may verify that the extracted calling domain matches the domain name of the IP telephony client 110 provided when creating a Transport Layer Security (TLS) connection between the IP telephony client 110 and the IP telephony server 102. Public key certificates may be provided by the IP telephony client 110 and/or the IP telephony server 102 when creating the TLS connection. The public key certificate provided by the IP telephony client 110 may be issued from a certificate authority trusted by the IP telephony server 102. The certificates may be cryptographically verified to ensure that the certificates have not been altered. A public key certificate may include a network domain or some other identifier of the organization to which the certificate was issued. The authorization server 104 may verify that the identifier in the public key certificate provided by the IP telephony client 110 matches an identifier included in the ticket 132. In the match of the domain included in the ticket 132 and the fails, the authorization server 104 may indicate that the IP telephony connection is unauthorized. If the match succeeds, the authorization server 104 may indicate that the IP telephony connection is authorized.

Alternatively, instead of transmitting the ticket 132 to the authorization server 104, the IP telephony server 102 may have access to the key used to create the ticket 132, and may, therefore, be able to extract the information from the ticket 132 and perform the authorization checks itself.

Alternatively, the ALG 106, upon receiving the IP telephony connection request en-route to the IP telephony server 102, may have access to the key used to create the ticket 132, and may therefore be able to extract the information from the ticket and/or verify the digital signature and perform the checks without involving the authorization server 104 or the IP telephony server 102.

In a different example, the called phone number encrypted in the ticket 132 may be a range of phone numbers that is assigned to the IP telephony server 102 instead of just the phone number originally called over the PSTN 116. As in the previous example, the authorization server 104, IP telephony server 102, or ALG 106 may decrypt the ticket 132 using the key to extract the extracted called phone number. The authorization server 104, IP telephony server 102, or ALG 106 may verify that the extracted called phone number matches the range of phone numbers that is assigned to the IP telephony server 102. Thus, when the called phone number encrypted in the ticket 132 is the range of phone numbers, the IP telephony client 110 may connect to the destination addresses associated with one or more phone numbers in the range of phone numbers. This lowers the cost of connecting to such destination addresses. Lowering the cost of connecting to such destination addresses benefits legitimate calling parties, but decreases the barriers to VoIP spam.

In one example, the authorization server 104 may include an authorization server identifier in the ticket 132. The authorization server identifier may be any identifier that distinguishes the authorization server 104 from among two or more authorization servers 104. The authorization server identifier may be unencrypted in the ticket 132. As discussed above, the ALG 106 may prevent an unauthorized request to create the IP telephony connection from entering the network 108. The ALG 106 may determine the authorization server identifier from the ticket 132 included in the request to create the IP telephony connection. The ALG 106 may use the authorization server 104 identified by the authorization server identifier to authenticate the incoming IP telephony connection before permitting the request to create the IP telephony connection to enter the network 108. In another example, the ALG 106 may use the key to decrypt and authenticate the incoming IP telephony connection.

Matching the demonstrated knowledge with the call data 120 may include comparing time data generated by a first clock included in the IP telephony server 102 with time data generated by a second clock included in the IP telephony client 110. Discrepancies between the first clock and the second clock may prevent a proper match. To avoid a match failure due to these discrepancies, the first clock and the second clock may be synchronized using, for example, a common time server. Additionally or alternatively, time data may be rounded to a predetermined precision or a tolerance may be used to overcome these discrepancies. In one example, the time data included in the demonstrated knowledge of the call may be a relative time calculated based on the time of the transmission of the demonstrated knowledge, where the relative time is determined from a difference in two clock values, both obtained from the first clock. The authorization server 104 may convert the relative time to an absolute time based on the receipt time of the demonstrated knowledge according to the second clock. The absolute time may differ from the time stored by the authorization server 104 by the delay incurred in transmitting the demonstrated knowledge over the Internet 114 and the network 108.

Alternatively, the demonstrated knowledge of the call may be provided by a database or other memory store independent of the IP telephony client 110. For example, the authorization server 104 may establish a trust relationship with the database. The IP telephony client 110 may also establish a trust relationship with the database. In one example, the trust relationships may be based on certificates issued from a common certificate authority. The IP telephony client 110 may transmit the call data 130 to the database. The network address of the IP telephony client 110 may be stored in the database. The IP telephony client 110 may initiate the creation of the IP telephony connection over TLS. The authorization server 104 may verify that the network address of sent as part of the TLS is associated with the call data 130 in the database. In this manner, the IP telephony client 110 may create the IP telephony connection with the IP telephony server 102 without transmitting the call data 130 or the ticket 132 to the IP telephony server 102 or authorization server 104.

FIG. 2 illustrates a format of the ticket 132 in one embodiment of the system 100 to prevent VoIP spam. The ticket 132 may include one or more fields 202, 204, 206, 208, 210, 212, 214, 216, 218, 220, 221 and 222. For example, the ticket 132 may include a ticket identifier 202, a version 204, an encryption algorithm identifier 206, salt 208, an initialization vector 210, a period of validity 212, a set of phone number ranges 214, one or more service identifiers 216, a granter 218, a grantee 220, an epoch 221, and a message authentication code 222. The ticket 132 may include additional, different, or fewer fields. One or more of the fields 212, 214, 216, 218, 220 and 221, may be included in an encrypted message 224 that is included in the ticket 132. The encrypted message 224 may include, for example, the period of validity 212, the set of phone number ranges 214, the service identifiers 216, the granter 218, the grantee 220, and the epoch 221. Each of the fields in the ticket 132 may include TLVs (Type-Length-Value).

The ticket identifier 202 may uniquely identify the ticket 132. For example, the ticket identifier 202 may be a universally unique identifier (UUID) that is 128 bits long. The version 204 may identify an implementation version so that the mechanism used to generate the ticket 132 may be changed in the future. For example, the version 204 may be "1" in an initial implementation. The encryption algorithm identifier 206 may describe the encryption algorithm used to encrypt or decrypt the encrypted message 224 of the ticket 132. Alternatively or in addition, the encryption algorithm identifier 206 may also identify the encryption algorithm used to generate the message authentication code 222. For example, the encryption algorithm identifier 206 may be "AES-128-CBC-HMAC-SHA1."

The salt 208 may be a random number. For example, the salt 208 may be a 32-bit integer. Inclusion of the salt 208 may help insure sufficient randomness to the ticket 132. The initialization vector 210 is a block of bits that may allow a stream cipher or a block cipher to be executed in any of several streaming modes of operation to produce a unique stream independent from other streams produced by the same encryption key. For example, the initialization vector 210 may be a 128-bit block used in cipher-block chaining (CBC) mode to encrypt the encrypted message 224. The initialization vector 210 may be unique to each respective one of the tickets 132 generated.

The period of validity 212 provides an indication of the period of time during which the ticket 132 is valid. The ticket 132 is valid if the authorization server 104 would verify the ticket 132 as valid. For example, the period of validity 212 may include a time at which the ticket 132 ceases to be valid. Additionally or alternatively, the period of validity may include a time at which the ticket 132 is first valid. In a different example, the period of validity 212 includes a time of issue and a duration value, where the duration value indicates the length of time from the time of issue of the ticket 132 during which the ticket 132 is valid. In another example, the period of validity 212 may include a start time and an end time.

The set of phone number ranges 214 may identify one or more phone numbers that are assigned to the IP telephony server 102. Additionally or alternatively, the set of phone number ranges 214 may identify one or more phone numbers for which the ticket 132 is valid. In one example, the set of phone number ranges 214 may include a string that is an E164 number, which may include a plus ("+") symbol.

The service identifiers 216 may identify one or more services for which the ticket 132 is valid. For example, the service identifier 216 may indicate that a VoIP call may be accepted with the ticket 132. Additionally or alternatively, the service identifier 216 may indicate that an instant message session may be accepted with the ticket 132.

The granter 218 may identify the authorization server 104 that issued the ticket 132. Additionally or alternatively, the granter 218 may identify an entity in charge of one or more authorization servers 104, such as a company. In one example, the granter 218 may include a node identifier of the peer-2-peer node that issued the ticket 132 and the domain that granted the ticket 132.

The grantee 220 may identify the IP telephony client 110 to which the ticket 132 was granted. For example, the grantee 220 may be the caller domain.

The epoch 221 may be a generation counter for keying material. The keying material may be any information related to the key used in encryption. When the keying material changes, then the epoch 221 may be increased by a determined value, such as one. The IP telephony client 110 may determine from the epoch 221 which set of keying material to use.

The message authentication code (MAC) 222 may be a piece of information used to verify the integrity of a message. A MAC algorithm accepts as input a secret key and an arbitrary-length message to be integrity-checked, and outputs a MAC 222. For example, the message may be the bits included in the ticket 132 except for the bits comprising the MAC 222. The MAC 222 protects both the data integrity and the authenticity of the message, by allowing verifiers in possession of the secret key to detect any changes to the message content. The secret key may be a MAC key, which is described later. In one example, the MAC 222 may be calculated using a keyed-Hash Message Authentication Code Secure Hash Algorithm (HMAC-SHA1).

During operation, the authorization server 104 may use two keys to generate the ticket 132: a message key and a MAC key. The authorization server 104 may use the message key to generate the encrypted message 224 with the encryption algorithm identified in the encryption algorithm identifier 206. The authorization server 104 may use the MAC key to generate the MAC 222 with the encryption algorithm identified in the encryption algorithm identifier 206. For example, the authorization server 104 may encrypt the encrypted message 224 using the Advanced Encryption Standard (AES) and a 128-bit fixed block size in cipher-block chaining (CBC) mode with the message key. In the same example, the authorization server 104 may determine the MAC 222 by computing the HMAC-SHA1 of the rest of the ticket 132 with the MAC key. The encryption algorithm identifier 206 in this example may be "AES-128-CBC-HMAC-SHA1."

The message key and the MAC key may be generated using a key strengthening technique. For example, the two keys may be generated using a Password-Based Key Derivation Function (PBKDF2). PBKDF2 is a key derivation function that is part of the Public-Key Cryptography Standards (PKCS) series, such as PKCS #5 v2.0. PBKDF2 applies a pseudorandom function, such as a cryptographic hash, cipher, or keyed-Hash Message Authentication Code (HMAC) to an input password or passphrase along with a salt value and repeats the process many times to produce a derived key, which can then be used as a cryptographic key in subsequent operations.

In one example, the message key may be generated as the function HMAC-SHA1 (P, S|Int(1)) and the MAC key may be generated as the function Trunc128(HMAC-SHA1 (P, S|Int (2)). S may be the salt 208. Int(x) is a 32-bit integer form of x. P is a password without null termination. Trunc128(x) is the first eight bytes of x. The password may be configured by an administrator. The same password may be used for the generated tickets. Periodically, the administrator may change the password and subsequent tickets may be generated with the new password. When the password is changed, the epoch 221 may be incremented. For each one of the tickets generated, a different value of the salt 208 may be used.

In another embodiment, the ticket 132 may include a message integrity check and include no encrypted data. For example, the ticket 132 may include a digital signature, such as the MAC 222. An unencrypted portion of the ticket 132 may include the grantee 220, which may indicate the domain of the IP Telephony client 110 for which the ticket 132 is valid. If, for example, the ticket 132 is altered by changing the grantee 220 included in the ticket 132, then a verification of the digital signature for ticket 132 would fail.

The ticket 132 may expire. In other examples, the ticket 132 may not expire. In one example, the authorization server 104 may transmit a new ticket 132 to the IP telephony client 110 prior to the older ticket 132 expiring. In another example, the IP telephony client 110 may request the new ticket 132 prior to the older ticket 132 expiring. The IP telephony client 110 may use the most recently received ticket 132 to initiate the IP telephony connection.

For example, the IP telephony client 110 may include the call data 130 of the original call in a request for the new ticket 132, such as by including the call data 130 in an HTTPS request transmitted to the authorization server 104. In a second example, the authorization server 104 may transmit a request for the call data of the original call in a HTTPS request. In a third example, the IP telephony client 110 may include the call data 130 of the original call in a request for the new ticket 132 sent over TLS. In a forth example, the IP telephony client 110 may make an additional call over the PSTN 116 if the ticket 132 is about to expire in order to get the new ticket 132. In a fifth example, as described above, the IP telephony client 110 may prove demonstrated knowledge of the original call without transmitting the call data 130 or any shared secret to the authorization server 104.

In one example, the authorization server 104 may issue the new ticket 132 without the IP telephony client 110 initiating an additional call over the PSTN 116. Additionally or alternatively, the authorization server 104 may issue the new ticket 132 only after the IP telephony client 110 makes an additional call over the PSTN 116.

If the ticket 132 transmitted by the IP telephony client 110 is rejected by the authorization server 104, the IP telephony client 110 may request the new ticket 132. The ticket 132 may be rejected for one or more reasons, such as the ticket 132 expired or the password changed from when the ticket 132 was issued.

The ticket 132 may be specially encoded for transmission in an IP telephony connection. For example, the ticket 132 may be base 64 encoded for inclusion within a SIP header.

Figure 3:
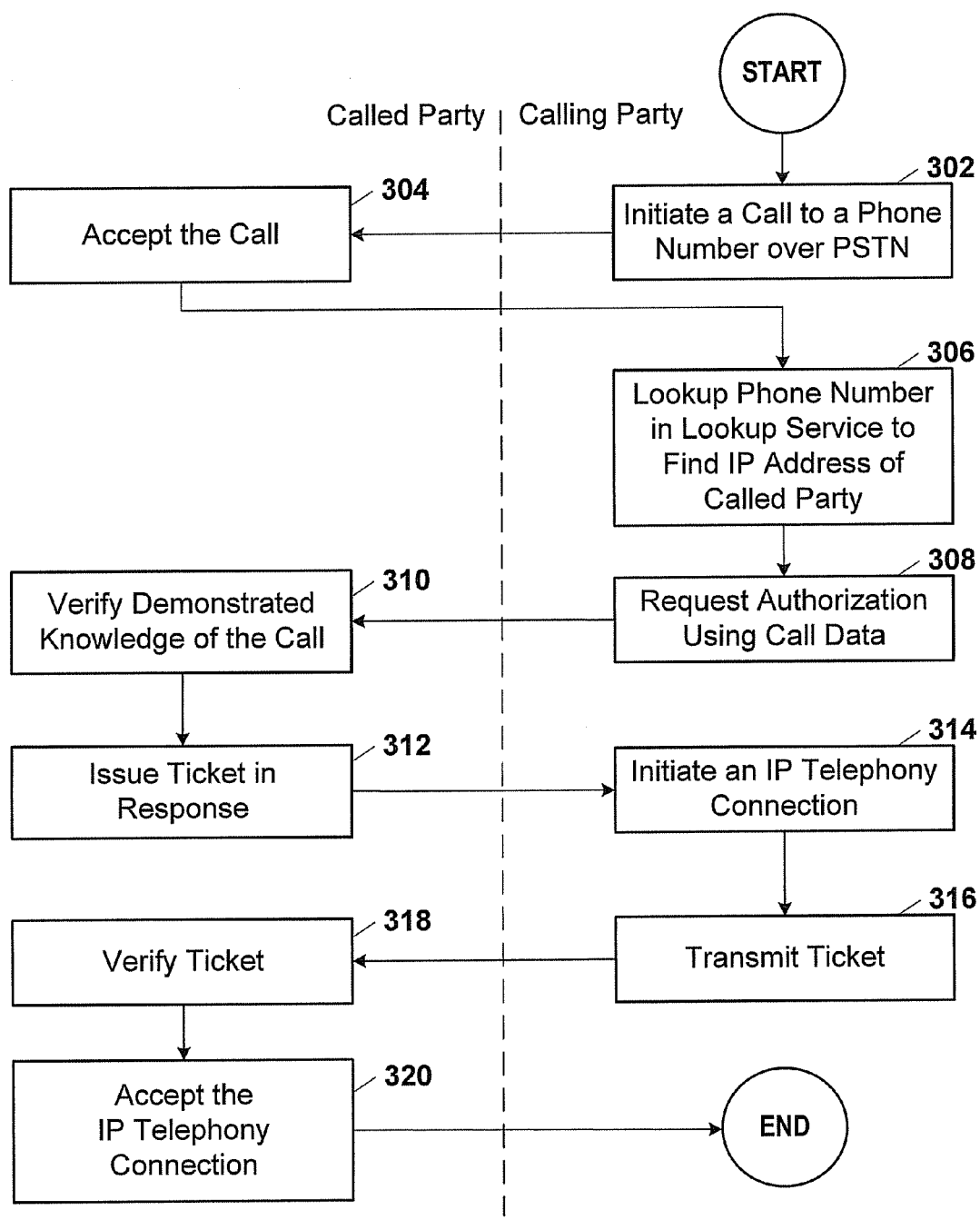
FIG. 3 illustrates one embodiment of a method to prevent VoIP spam.

FIG. 3 illustrates one embodiment of a method to prevent VoIP spam. Additional, different, or fewer acts may be performed. The acts may be performed in a different order than illustrated in FIG. 3.

In act 302 of the embodiment illustrated in FIG. 3, the operation may begin by initiating the call to the phone number over the PSTN 116. The operation may continue in act 304 by accepting the call.

A random amount of time after the call was accepted and/or completed, the operation may continue in act 306 by looking up the address of the IP telephony server 102 using the phone number. The operation may continue in act 308 by requesting authorization from the authorization server 104 to make a subsequent call over a new IP telephony connection.

In act 310, the operation may include verifying the IP telephony client 110 has the demonstrated knowledge of the call. The operation may also include determining whether the domain of the IP telephony client 110 is permitted, based on configured policy. The operation may continue in act 312 by issuing the ticket 132 in response to successfully verifying the demonstrated knowledge of the call.

In act 314, the operation may continue immediately, and/or later when a call is to be made, by transmitting the request to create the IP telephony connection. In act 314, the operation may also include checking that the called domain is permitted based on a configured policy. In act 316, the operation may include transmitting the ticket 132.

In act 318, the operation may include verifying the validity of the ticket 132. In act 320 of the one embodiment, the operation may conclude by accepting the IP telephony connection in response to verification that the request to create the IP telephony connection includes the verified ticket 132.

Both the IP telephony client 110 and the IP telephony server 102 may be VoIP call agents that may transmit and receive new VoIP call requests. Consequently, the IP telephony client 110 may act as the P telephony server 102 and, conversely, the IP telephony server 102 may act as the IP telephony client 110.

Figure 4:
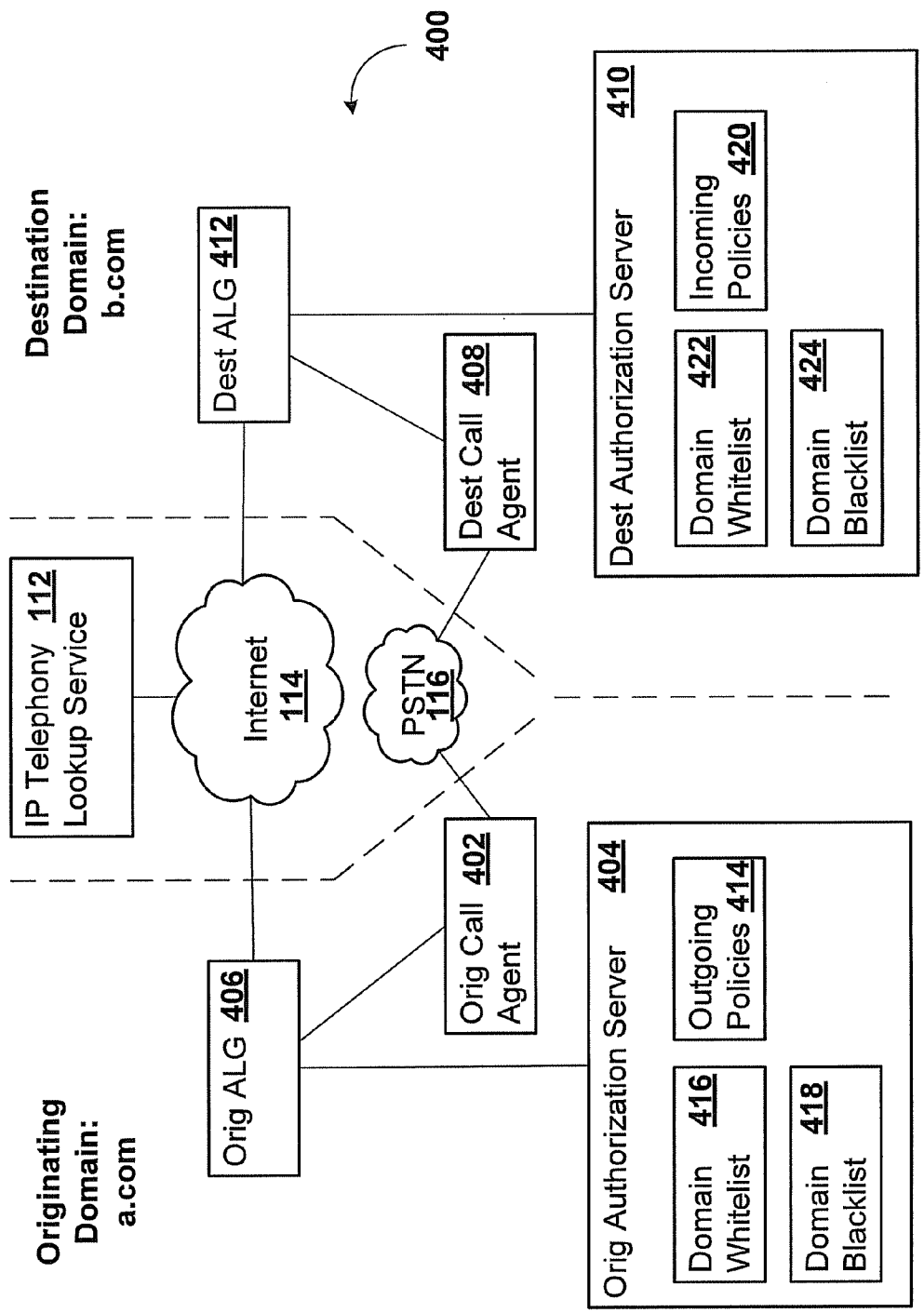
FIG. 4 illustrates an example of a system to limit acceptance and/or initiation of VoIP calls to a set of determined domains.

FIG. 4 illustrates an example of a system 400 to limit acceptance and/or initiation of VoIP calls to a set of determined domains. The system 400 may include an originating call agent 402, an originating authorization server 404, an originating ALG 406, a destination call agent 408, a destination authorization server 410, and a destination ALG 412. The system 400 may include fewer, additional, or different components. For example, the system 400 may include the IP telephony lookup service 112, a peer-to-peer network, or any other registry suitable to lookup VoIP connection information for a destination telephone number.

The originating call agent 402, the originating authorization server 404, and the originating ALG 406 may be in an originating domain. For example, the originating domain may be "a.com." The destination call agent 408, the destination authorization server 410, and the destination ALG 412 may be in a destination domain. For example, the destination domain may be "b.com."

The originating call agent 402 and the destination call agent 408 may be any call agent. A call agent 402 or 408 may initiate and receive VoIP calls. Examples of the call agent 402 or 408 include an IP-PBX hosting call manager application, an IP to IP gateway, a Session Border Controller (SBC), Back-to-Back User Agent (B2BUA) connected to an existing TDM PBX, IP PBX, other voice or voice over IP equipment, the IP telephony server 102 described above, and the IP telephony client 110 described above.

The originating authorization server 404 and the destination authorization server 410 are examples of the authorization server 104 described above. The originating ALG 406 and destination ALG 412 may be examples of the ALG 106 described above. Alternatively, the originating ALG 406 and the destination ALG 412 may be firewalls.

Communication between the originating domain and the Internet 114 or other public network may pass through the originating ALG 406. The originating ALG 406 may be in communication with other components in the originating domain, such as the originating call agent 402 and the originating authorization server 404. The originating call agent 402 may be in communication with the PSTN 116. In a different example, the originating call agent 402 may not be in communication with the PSTN 116.

Similarly, communication between the destination domain and the Internet 114 or other public network may pass through the destination ALG 412. The destination ALG 412 may be in communication with other components in the destination domain, such as the destination call agent 408 and the destination authorization server 410. The destination call agent 408 may be in communication with the PSTN 116. In a different example, the destination call agent 408 may not be in communication with the PSTN 116.

The destination call agent 408 may be reachable over the PSTN 116 from the originating call agent 402 at a destination telephone number. During operation of the system 400, the originating call agent 402 may attempt to establish a VoIP connection to the destination call agent 408. To discover VoIP routing information used to establish the VoIP connection, the originating call agent 402 may obtain the VoIP call routing information from the IP telephony lookup service 112, such as a registry.

The VoIP call routing information maintained in the registry may be accessible to one or more of the call agents 402 and 408. In one implementation, the registry may be discoverable and publicly accessible. In one example, the VoIP call routing information may include a set of entries, each including a telephone number or a prefix that represents a range of telephone numbers (or a set of telephone numbers or prefixes). For example, a given enterprise may own the telephone number +1-408-876-5432 and an address block of telephone numbers +1-973-952-5000 through +1-973-952-5999. As such, the call agent 402 or 408 of the enterprise may create two entries and would register, for each, a mapping that associates its identity with the number or prefix. In one implementation, the key for the mapping is the number or prefix of the number, including the digits only. In the example above, one key would be 14088765432, and the other would be 19739525. As such, in one implementation, each one of the call agents 402 and 408 may register blocks of telephone numbers that the corresponding one of the call agents 402 and 408 owns by treating the prefix as a number and entering it in the registry. The identity information may include a network address (e.g., IP address, port number, hostname, node id, etc.) or any other type of information that identifies the call agent 402 or 408, or a component associated with the call agent 402 or 408, such as a corresponding one of the authorization servers 404 or 410.

In one example, participation in the P2P network may involve the call agent 402 or 408 having a predefined minimum number (e.g., a few dozen) of TCP connections to other nodes in the network. The TCP connections may be established dynamically, with the peers learned through the P2P protocols. In one implementation, registration in the P2P network may involve running an algorithm to select a peer to which a write operation should take place. That peer, in turn, may pass the write onto another peer, and so on. This results in the data being stored and distributed across the call agents 402 or 408 participating in the P2P network.

As discussed above, the registry of VoIP call routing information may include a hash-based mechanism protecting against unfettered access to the registry. That is, the telephone numbers or prefixes in the registry entries may be hashed values. To store an entry in the registry, the call agent 402 or 408 may first hash an owned phone number or prefix before storing the phone number in the registry in association with an identity of the call agent 402 or 408. The call agent 402 or 408 may hash the telephone number or prefix using any suitable hash algorithm, such as MD5 and SHA1. Generally, a strong hash function should be used to ensure that the hashed value is unique to a given telephone number or prefix. By hashing the prefix or phone number, the call agent 402 or 408 may advertise number blocks in a secure manner. For example, using hashed telephone numbers or prefixes may prevent telemarketers, spammers and spitters (VoIP spammers) from simply collecting telephone numbers from the registry. In such an example, a user would have to know the correct telephone number first before successfully searching the registry and finding the VoIP call routing information. Because of the substantial computing resources required to compute the hash, attempting to learn a significant amount of the VoIP call routing information maintained in the registry by repeatedly selecting a telephone number or prefix, computing a hash value and looking it up against the registry may be computationally expensive.

Topologically, the registry of VoIP call routing information may be maintained in a variety of ways. In one implementation, the registry may be maintained using a P2P network. The P2P network may be made up of all or some of the call agents in the system, or the registry can be maintained in a different P2P network, accessed by all of the call agents 402 and 408 in the system 400. When a P2P network is utilized, each node in the P2P network (which may be the call agents 402 and 408 and/or the authorization servers 404 and 410), may end up maintaining a subset of the information in the registry, depending on the P2P protocols that are in use. Any suitable P2P protocol or technique may be used, including Chord, CAN, Bamboo, Kademlia, and any other P2P protocol now known or later discovered.

In some examples that utilize a centralized registry system, a central server may maintain the registry, where the registry may be a central repository accessible by one or more call agents 402 and 408. In one example, the call agent 402 or 408 may send a phone number or prefix to a central data store, and the central data store will store the phone number or the prefix. Other call agents 402 and 408 may query the central data store, and retrieve the mapping from the phone number to the identity of the call agent. In another example, the central registry may hash the phone number or prefix and store the hashed phone number or prefix in the registry.

In examples that utilize a hierarchical registry system, such as the domain name system (DNS), the call agent 402 or 408 may transform the phone number or prefix into a hierarchical identifier, for example, by utilizing a telephone number mapping protocol, such as the Electronic Numbering (ENUM) protocol defined by the IETF (Internet Engineering Task Force) in RFC 2916. The call agent 402 or 408 may then use hierarchical identifier to write the VoIP call routing information into the hierarchical system at the appropriate location. The servers in the hierarchy may be the same as the call agents 402 and 408, or different. If the DNS is used as the hierarchical system, this may be a public DNS or a private DNS.

The destination call agent 408 may receive an originating telephone number in a call initiation message from an originating call agent 402, and then use the telephone number to lookup VoIP call routing information in the registry. In one example, the destination call agent 408 may search the registry for each of the N−1 prefixes of the N-digit destination number. Searches may be based on exact matches, as opposed to hierarchical matches. In other words, one address block should be found, and if more than one address block is found, the most specific one is used. Assuming there is a matching entry in the registry, the identity of the originating call agent 402 for that number or number block (that was found may be cached to avoid queries in the future.

Responsive to some event, such as receiving a call initiation message from a client of the originating call agent 402, where the call initiation message identifies the destination telephone number, the originating call agent 402 may compute a hash of the destination telephone phone number. The originating call agent 402 may search the registry and determine if there is a matching entry, or specifically, if the hashed destination telephone number matches any hashed numbers in the registry. If so, VoIP call routing information corresponding to the matching entry is returned and possibly used in some other process implemented by the originating call agent 402. For example, in one example, the IP address of the destination call agent 408 corresponding to the telephone number may be used to route a VoIP call. In a different example, the IP address of the destination authorization server 410 is returned.

If there is no matching entry, the look up process determines if the telephone number is stripped to a minimum threshold number of digits. In one example, the minimum threshold may be a predefined number of digits. For example, the minimum threshold number may be 1 digit, which, for example, is the smallest country code possible. If the telephone number is stripped to a minimum threshold number of digits, the look up process may return a "not found" message. The originating call agent 402 may respond to this message in a variety of ways depending on the context. For example, in one implementation, the originating call agent 402 may attempt to make a PSTN call instead of a VoIP call, or may deny the call, optionally notifying the originating client of the call denial and optionally providing a reason for denying the call.

If the destination phone number is not stripped to a minimum threshold number, the look up process may strip the last digit of the telephone number. The originating call agent 402 may then re-compute the hash of the modified telephone number and determine if the re-computed hashed telephone number matches any hashed telephone numbers in the registry. The originating call agent 402 may continue this process until a matching entry is found or until the destination phone number has been stripped down to the minimum threshold number.

This process provides security to the system, because without a legitimate phone number, it may be computationally expensive to acquire phone numbers. In one example, policies may be applied at the registry to detect suspicious nodes that transmit queries that result in greater than a threshold number of failures over a sliding window of time.

As described in more detail below, the originating call agent 402 may use the facilities of a PSTN to validate the VoIP call routing information returned from the registry. For example, the originating call agent 402 may verify that the destination call agent 408 can legitimately claim ownership of a telephone number the call agent 408 wrote into the registry. Here, "ownership" may imply the property that, had the call been made over the PSTN, the call would have been routed to the destination call agent 408 that wrote the entry into the registry, or if not that call agent, another call agent under the same administrative control. For example, the originating call agent 402, responsive to a call initiation request to the destination telephone number, may make a PSTN call to that telephone number over the PSTN 116. Generally, if the call destination call agent 408 claiming ownership of the destination telephone number is authentic, the destination call agent 408 will receive the PSTN call over the PSTN 116. Thus, both the originating call agent 402 and the destination call agent 408 will have an opportunity to record one or more attributes of the PSTN call, such as start time, end time, calling party identifier, and the like. The PSTN call attribute information may be used as a shared secret to allow the call agents 402 and 408 to validate the other call agent. The verification of the destination call agent 408 may occur during or after a PSTN call.

The originating call agent 402 may store verified VoIP call routing information in a local cache. The originating call agent 402, responsive to a new call initiation message identifying the destination telephone number, may selectively place a PSTN or VoIP call to the destination telephone number depending on the presence or absence of validated VoIP call routing information in the cache that corresponds to the destination telephone number. The originating call agent 402 may then place a VoIP call by transmitting a call initiation message to the destination call agent 408. If no validated match is found in the cache, but the number is in the cache as a consequence of a previous query to the registry, the originating call agent 402 may place a PSTN call and subsequently validate the destination call agent 408. If no match is found in the cache at all, the originating call agent 402 or 408 may query the registry for the number as described above, in addition to placing a PSTN call.

Prior to storing the VoIP call routing information in the local cache, the originating call agent 402 may, in one example, check the VoIP call routing information against a set of outgoing policies 414. For example, the domain of the destination call agent 408 may be checked against a whitelist 416 and/or blacklist 418. The VoIP call routing information may include the domain of the destination call agent 408. If the domain of the destination call agent 408 is included in the whitelist 416, the VoIP call routing information may be stored in the local cache. However, if the domain is not included in the whitelist 416, the VoIP call routing information may not be stored in the local cache. Alternatively, or in addition, if the domain of the destination call agent 408 is included in the blacklist 418, then the VoIP call routing information may not be stored in the local cache. In one example, the destination telephone may be flagged to indicate that the domain corresponding to the telephone number is not trusted. By flagging the number, the originating call agent 402 may subsequently skip looking up the destination telephone number in the registry and verifying the returned VoIP call routing information. In a second example, outgoing policies 414 may not be checked at all. In a third example, the outgoing policies 414 may be checked when establishing a connection to the destination call agent 408 as described below. In a fourth example, the outgoing policies 414 are checked during the validation of the destination call agent 408 as described below.

The originating VoIP call agent 402, the originating authorization server 404, and/or the originating ALG 406 may check the outgoing policies 414. For example, the originating VoIP call agent 402 may transmit a request to the originating authorization server 404 to perform the check of the outgoing policies 414.

The VoIP call routing information stored in the local cache—or just returned from the registry—may identify the destination authorization server 410 instead of or in addition to the destination call agent 408. For the originating call agent 402 to make a VoIP call to the destination call agent 408, the originating call agent 402 may have to present a valid ticket 132 issued from the destination authorization server 410.

In the example illustrated in FIG. 4, the originating call agent 402 may issue a request for the ticket 132 to the destination authorization server 410. The destination authorization server 410 may check a set of incoming policies 420 against the request for the ticket 132 before generating the ticket 132. For example, one of the incoming policies 420 may be for the originating call agent 402 to demonstrate knowledge of one or more PSTN calls to the destination call agent 408. Alternatively or in addition, one of the incoming policies 420 may be that the domain of the originating call agent 402 must be included in a domain whitelist 422. Alternatively or in addition, one of the incoming policies 420 may be that the domain of the originating call agent 402 must not be included in a domain blacklist 424. If the incoming policies 420 are satisfied, then the destination authorization server 410 may generate and return the ticket 132 to the originating call agent 402.

In one example, the destination authorization server 410 may generate and return the ticket 132 without verifying that the domain of the originating call agent 402 is actually the domain identified by the originating call agent 402. Alternatively or in addition, when obtaining the ticket 132, the destination authorization server 410 may verify the identity of the domain of the originating call agent 402. For example, when obtaining the ticket 132, the originating call agent 402 may issue a request to the destination authorization server 410 to establish a connection and exchange certificates for each of the originating call agent 402 and the destination authorization server 410. The certificates may provide proof of the domain of the respective the originating call agent 402 or the destination authorization server 410. In one example, the certificates may be digitally signed public key certificates. In one implementation, an exchange of public key certificates is part of establishing a TCP/TLS connection. In a different example, any suitable protocol may be used where certificates are exchanged as part of establishing a connection or after the connection is established.

The ticket 132 may include identifiers for each respective one of the domains corresponding to the originating call agent 402 and the destination call agent 408. In one example, the originating call agent 402 may check the domain of the destination call agent 408 to verify that the domain satisfies the outgoing policies 414 upon receipt of the ticket 132. If the domain fails to satisfy the outgoing policies 414, the ticket 132 and the corresponding VoIP call routing information may be discarded. The originating call agent 402 may, for example, initiate a call to the destination number over the PSTN 116 instead of initiating a VoIP call the outgoing policies 414 are not satisfied.

In possession of the ticket 132, the originating call agent 402 may attempt to establish a VoIP connection to the destination call agent 408. As part of the VoIP connection request, the originating call agent 402 may issue a request to the destination call agent 408 to establish an initial connection and exchange certificates for each of the originating call agent 402 and the destination call agent 408. The certificates may provide proof of the domain of the respective the originating call agent 402 or destination call agent 408. In one example, the certificates may be digitally signed public key certificates. In one implementation, an exchange of public key certificates may be part of establishing a TCP/TLS connection between the two agents. In a different example, any suitable protocol may be used where certificates are exchanged as part of establishing a connection or after the connection is established.

In one example, the ticket 132 may be included the initial connection request. For example, the ticket 132 may be included in a request to create a TCP/TLS connection. Before the TCP/TLS connection request reaches the destination call agent 408, the connect request may pass through the destination ALG 412. The destination ALG 412 may verify the TCP/TLS connection request. In particular, the destination ALG 412 may compare the domain identified in the ticket 132 with the domain identified in the certificate provided by the originating call agent 402. If there is not a match, the destination ALG 412 may reject the connection request.

In a different example, the initial connection may be established between the originating call agent 402 and the destination ALG 412 without the ticket 132. The originating call agent 402 may subsequently include the ticket 132 in a call initiation message in a suitable call control protocol. For example, the originating call agent 402 may include the ticket 132 in a SIP invite request transmitted over a previously established TCP/TLS connection. The destination ALG 412 may verify the call initiation message before forwarding the call initiation message to the destination call agent 408. The destination ALG 412 may verify the call initiation message by comparing the domain identified in the ticket 132 with the domain identified in the certificate of the originating call agent 402. The destination ALG 412 may discard the call initiation message instead of forwarding to the destination call agent 408 if the verification fails.

Alternatively or in addition, the destination authorization server 410 may issue the ticket 132 when the originating call agent 402 verifies the call routing information received from the registry. Because both the destination authorization server 410 and the originating call agent 402 have knowledge of one or more previous PSTN calls made from the originating call agent 402 to the destination call agent 408, both can demonstrate knowledge of the PSTN calls. Therefore, the destination authorization server 410 may check incoming policies 420 before issuing the ticket 132 and the originating authorization server 404 may check outgoing policies 414 before storing the VoIP call route information in the local cache of valid routes.

Thus, in the example illustrated in FIG. 4, from the perspective of the originating domain, routes to undesired target enterprises are rejected outright and are not even stored in the local cache of VoIP call routing information. From the perspective of the destination domain, VoIP calls from undesired enterprise are rejected at the destination ALG 412 through ticket validation. Tickets are not even granted to unauthorized domains.

After tickets 132 are issued, the domain identified in the ticket 132 may be removed from the domain whitelist 422. For example, the enterprise responsible for the destination domain may wish to revoke authorization to the domain. Revocation of authorization may be handled in different ways.

For example, when the domain is removed from the whitelist 422, the destination authorization server 410 may notify the destination ALG 412 that authorization of the domain has been revoked. When verifying the VoIP connection request, the destination ALG 412 may check the domain in the ticket 132 against a revocation list. The revocation list may be relatively short so looking up the domain in the revocation list may be computationally inexpensive.

Alternatively or in addition, the destination call agent 408 may reject the VoIP connection request with a predetermined error code that indicates the domain has been rejected due to the revocation of the domain. For example, the destination call agent 408 may respond to a SIP invite request with a special SIP response code. In response to detecting the predetermined error code in the response, the ALG 412 may cache the revoked domain in the revocation list. The ALG 412 may reject subsequently received VoIP connection requests from the revoked domain. If the revoked domain is later re-authorized, the destination authorization server 410 and/or destination call agent 408 may notify the ALG 412 that the domain should be removed from the revocation list.

Figure 5:
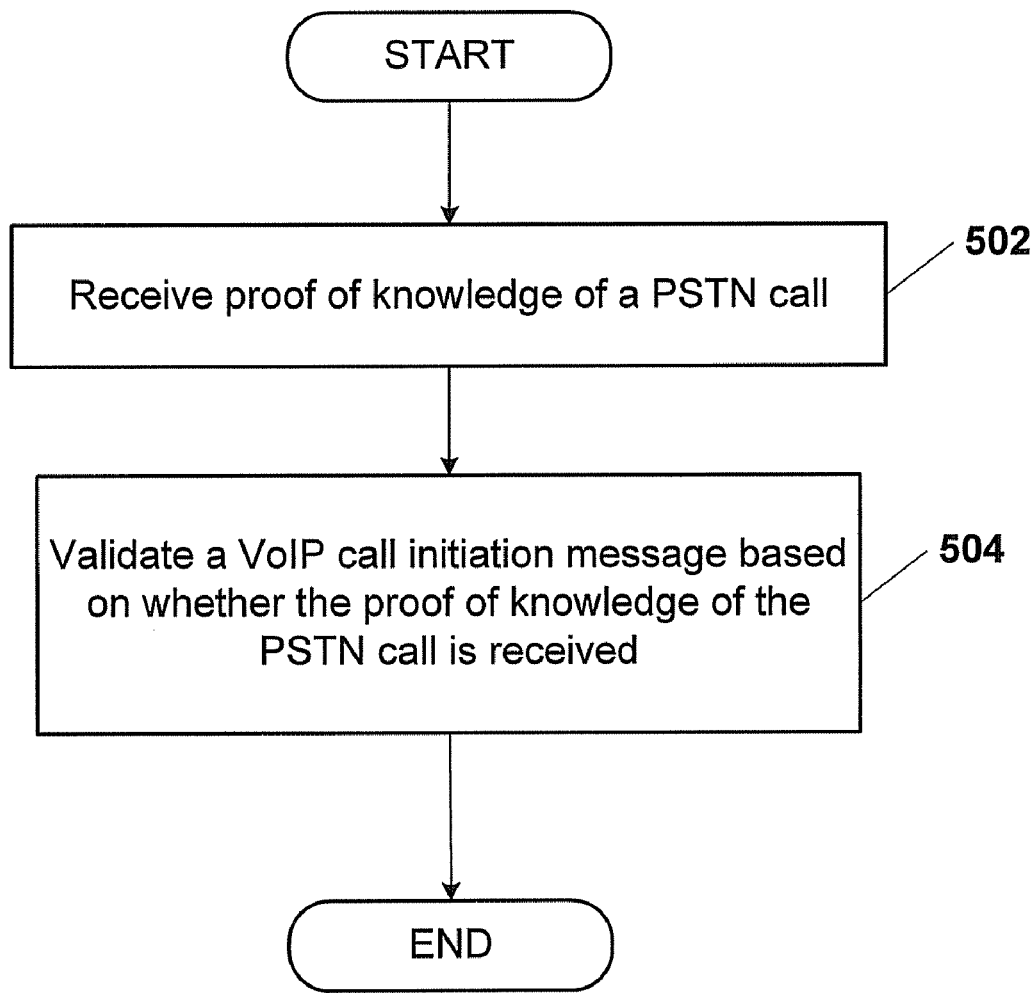
FIG. 5 illustrates a flow diagram of the operation of a first example of the system to restrict acceptance of VoIP calls.

FIG. 5 illustrates a flow diagram of the operation of a first example of the system 400 to restrict acceptance of VoIP calls. The operation may include additional, fewer, or different blocks.

The operation may begin at block 502 by receiving proof of knowledge of a PSTN call. For example, call attributes of the PSTN call may be received from the originating call agent 402. In a different example, the call attributes of the PSTN call may be a shared secret and receiving proof of the knowledge of the PSTN call may include using a shared-secret-based protocol to receive proof of the knowledge of the PSTN call without actually receiving the knowledge from the originating call agent 402.

The operation may continue at block 504 by validating a VoIP call initiation message based on whether the proof of knowledge of the PSTN call is received. For example, if the VoIP call initiation message is determined to be valid, then the call initiation message may be accepted. However, if the VoIP call initiation message is determined to be invalid, then the call initiation message may be rejected.

Figure 6:
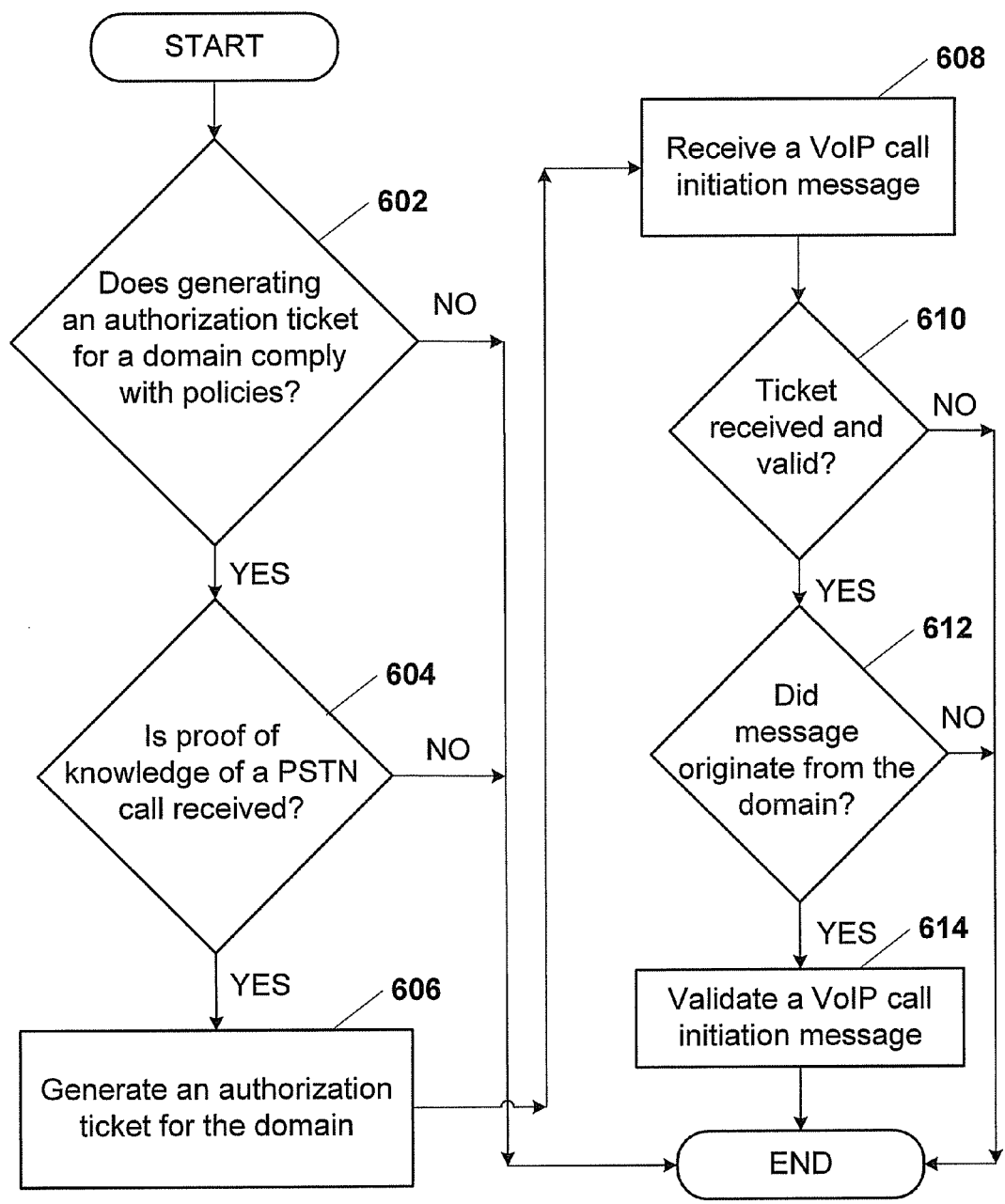
FIG. 6 illustrates a flow diagram of the operation of a second example of the system to restrict acceptance of VoIP calls.

FIG. 6 illustrates a flow diagram of the operation of a second example of the system 400 to limit acceptance of VoIP calls. The operation may include additional, fewer, or different blocks.

The operation may begin at block 602 by checking whether generating an authorization ticket for a domain complies with incoming policies 420. For example, the incoming policies 420 may include a policy that the domain be included in a list of trusted domains. If generating the authorization ticket complies with the configured incoming policies 420, then the operation may continue to block 604. However, if generating the authorization ticket does not comply with the configured incoming policies 420, then the operation may end by, for example, not generating the authorization ticket. Without the authorization ticket, an originating call agent 402 may not be able to establish a VoIP call to the destination call agent 408.

At block 604, the operation may continue by checking whether proof of knowledge of a PSTN call is received. If the proof of knowledge of the PSTN call is received, then the operation may continue to bock 606. However, if the proof of knowledge of the PSTN call is not received, then the operation may end by, for example, not generating the authorization ticket.

At block 606, the operation may continue by generating the authorization ticket for the domain. After generating the authorization ticket, the operation may continue at block 608 by receiving the VoIP call initiation message.

At block 610, the operation may verify that the authorization ticket was received and is valid. If not, then the operation may end by, for example, rejecting the VoIP call initiation message. Otherwise the operation may, at block 612, verify that the VoIP call initiation message originated from the domain for which the authorization ticket is valid, and check that the called number matches the authorized called number range from the ticket. If the VoIP call initiation message did not originate from the domain, or if the called number does not match the authorized called number range in the ticket, then the operation may end by, for example, rejecting the VoIP call initiation message. However, if the VoIP call initiation message did originate from the domain, then the operation may continue at block 614 by validating the VoIP call initiation message to indicate the VoIP call initiation message is valid.

Paragraphs 84 to 91 of U.S. patent application Ser. No. 11/780,928, "USING PSTN REACHABILITY TO VERIFY VoIP CALL ROUTING INFORMATION" filed Jul. 20, 2007, also describe a system to restrict communication in a VoIP address discovery system. The cited paragraphs describe a processor that validates the Voice over Internet Protocol (VoIP) call initiation message based on demonstrated knowledge of a Public Switched Telephone Network (PSTN) call. Examples of the system are also described in connection with FIGS. 4, 6, 7A and 7B of U.S. patent application Ser. No. 11/780,928.

Different components provide different functions for implementing the functionality of the various embodiments. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Logic encoded in one or more tangible media for execution is defined as instructions that are executable by the processor and that are provided on the tangible computer-readable storage media, memories, or a combination thereof.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A system comprising:
a memory; and
a processor in communication with the memory, the memory including computer code executable with the processor, wherein the computer code is executable to:
receive, from an originating Voice over Internet Protocol (VoIP) call agent, proof of demonstrated knowledge of an attribute of a Public Switched Telephone Network (PSTN) call, the PSTN call received at a destination call agent, the attribute of the PSTN call demonstrating knowledge of the PSTN call; and
validate a VoIP call initiation message received from the originating VoIP call agent based on a determination that the proof of demonstrated knowledge of the attribute of the PSTN call is received from the originating VoIP call agent, wherein validation of the VoIP call initiation message indicates the VoIP call initiation message is an authorized request for a VoIP call.

2. The system of claim 1, wherein the computer code is further executable to generate an authorization ticket in response to the receipt of the proof of the demonstrated knowledge of the attribute of the PSTN call from the originating VoIP call agent, wherein the computer code executable to validate the VoIP call initiation message is executable to validate the VoIP call initiation message based on receipt of the authorization ticket from the originating VoIP call agent, and wherein the authorization ticket is also proof of demonstrated knowledge of the attribute of the PSTN call.

3. The system of claim 2, wherein the authorization ticket indicates a domain for which the authorization ticket is valid, and wherein the computer code executable to validate the VoIP call initiation message is further executable to verify the VoIP call initiation message originated from the domain.

4. The system of claim 3, wherein the computer code executable to verify the VoIP call initiation message originated from the domain is executable to determine an originating domain of the VoIP call initiation message from a public key certificate.

5. The system of claim 3, wherein the computer code executable to generate the authorization ticket is further executable to generate the authorization ticket in response to verification that the domain is included in a set of trusted domains.

6. The system of claim 3, wherein the computer code executable to generate the authorization ticket is further executable to generate the authorization ticket in response to verification that the domain is not found in a set of untrusted domains.

7. The system of claim 1, wherein the computer code executable to validate the VoIP call initiation message is further executable to verify the demonstrated knowledge based on a shared-secret based protocol, wherein the attribute of the PSTN call is a shared secret.

8. Logic encoded in one or more tangible non-transitory media for execution by a processor and when executed is operable to:
store knowledge of a call data of a Public Switched Telephone Network (PSTN) call initiated over a circuit switched network from an originating domain to a telephone phone number;
determine a destination address in a destination domain for the telephone phone number; and
transmit at least one message from the originating domain to the destination address in the destination domain over a network different from the circuit switched network, the at least one message operable to demonstrate the knowledge of the call data of the PSTN call for authorization to create a Voice over Internet Protocol (VoIP) connection from the originating domain to a destination call agent in the destination domain, wherein the authorization to create the VoIP connection is granted based on a match of the knowledge of the call data of the PSTN call at the destination domain.

9. The one or more tangible media of claim 8, wherein the logic when executed is also operable to receive an authorization ticket in response to a demonstration of the knowledge of the PSTN call.

10. The one or more tangible media of claim 9, wherein the authorization ticket includes an identifier of a domain for which the authorization ticket is valid, and the logic when executed is further operable to:
transmit the authorization ticket in a Voice over Internet Protocol (VoIP) connection request; and transmit a public key certificate to demonstrate the VoIP connection request is transmitted from the domain.

11. The one or more tangible media of claim 8, wherein the knowledge of the call data of the PSTN call includes at least one of a start time of the PSTN call and an end time of the PSTN call.

12. The one or more tangible media of claim 8, wherein the logic when executed is also operable to verify an identifier of the destination call agent is in a list of identifiers of trusted entities.

13. The one or more tangible media of claim 8, wherein the logic when executed is also operable to verify an identifier of the destination call agent is not in a list of identifiers of untrusted entities.

14. A method comprising:
   receiving, from an originating Voice over Internet Protocol (VoIP) call agent, proof of knowledge of an attribute of a Public Switched Telephone Network (PSTN) call, the PSTN call received at a destination call agent, the attribute of the PSTN call demonstrating knowledge of the PSTN call; and
   validating, with a processor, a VoIP call initiation message received from the originating VoIP call agent based on a determination that the proof of knowledge of the attribute of the PSTN call is received from the originating VoIP call agent, wherein validation of the VoIP call initiation message indicates the VoIP call initiation message is an authorized request for a VoIP call.

15. The method of claim 14, further comprising generating an authorization ticket based on whether the proof of knowledge of the attribute of the PSTN call is received, wherein validating the VoIP call initiation message comprises receiving the authorization ticket and verifying the authorization ticket is valid.

16. The method of claim 15, wherein generating the authorization ticket comprises cryptographically signing the authorization ticket, wherein the authorization ticket includes an identifier of the domain, and wherein verifying the authorization ticket comprises verifying a digital signature included in the authorization ticket.

17. The method of claim 15, wherein validating the VoIP call initiation message further comprises verifying that the VoIP call initiation message originated from a domain for which the authorization ticket is valid.

18. The method of claim 15, further comprising:
   determining authorization for a domain is revoked, wherein the authorization ticket indicates the domain is an authorized domain;
   including, at a call agent, a predetermined response code in a response to the VoIP call initiation message, the predetermined response code indicating the authorization for the domain is revoked; and
   storing, at an application-level gateway, an identifier of the domain in a blacklist in response to detecting the predetermined response code in the response.

19. The method of claim 15, wherein generating the authorization ticket further comprises generating the authorization ticket for a determined domain in response to both receiving proof of knowledge of the attribute of the PSTN call and finding the determined domain in a list of authorized domains.

20. The method of claim 18, wherein generating the authorization ticket further comprises generating the authorization ticket for a determined domain in response to both receiving proof of knowledge of the attribute of the PSTN call and verifying the determined domain is not included in a list of unauthorized domains.

* * * * *